May 18, 1937. M. T. ZEIGLER 2,080,452
ICE CUTTING MACHINE
Filed Nov. 10, 1933 9 Sheets-Sheet 1

INVENTOR
MAXWELL T. ZEIGLER
BY Hazard and Miller
ATTORNEYS

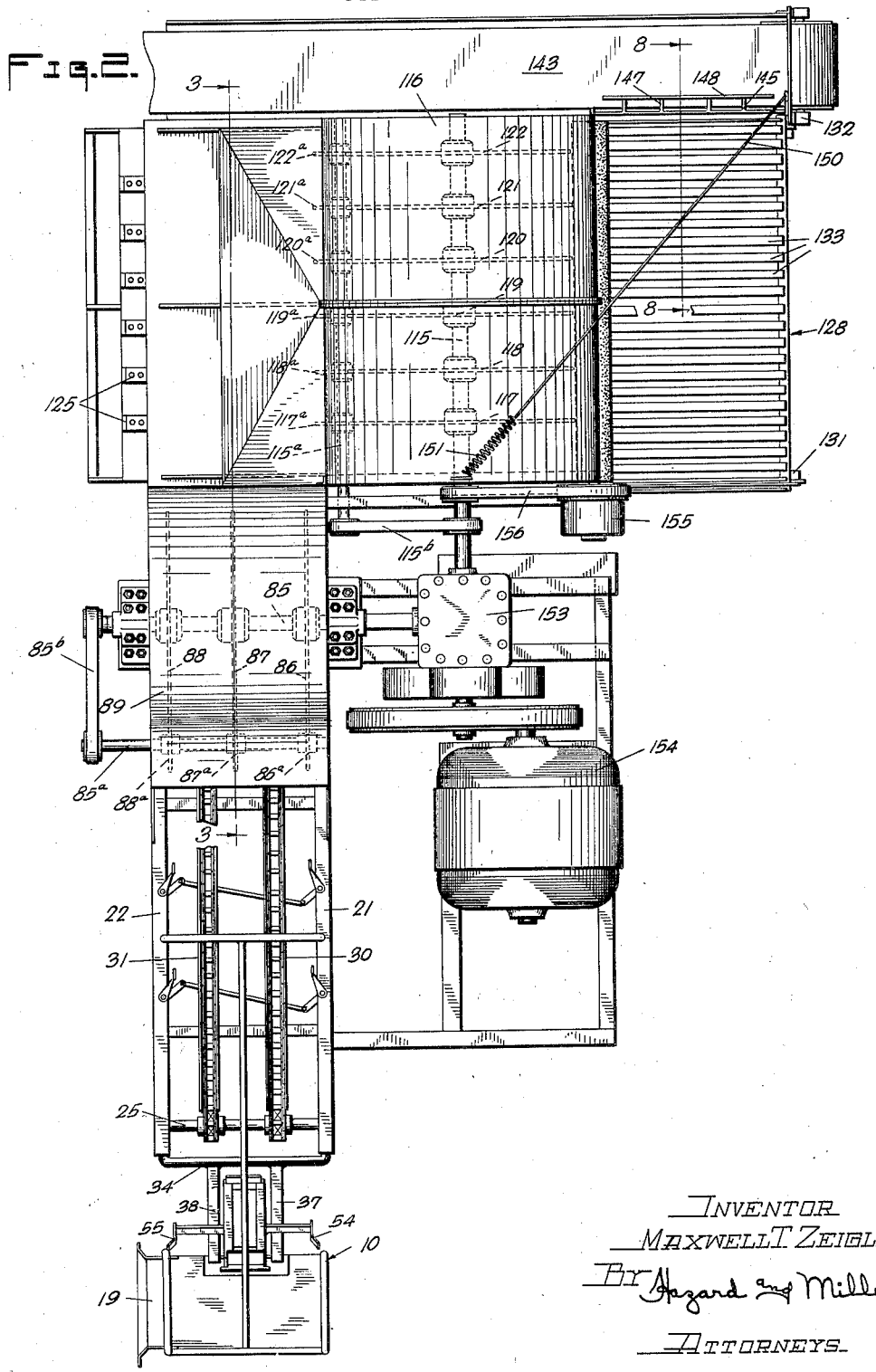

May 18, 1937. M. T. ZEIGLER 2,080,452
ICE CUTTING MACHINE
Filed Nov. 10, 1933 9 Sheets-Sheet 3
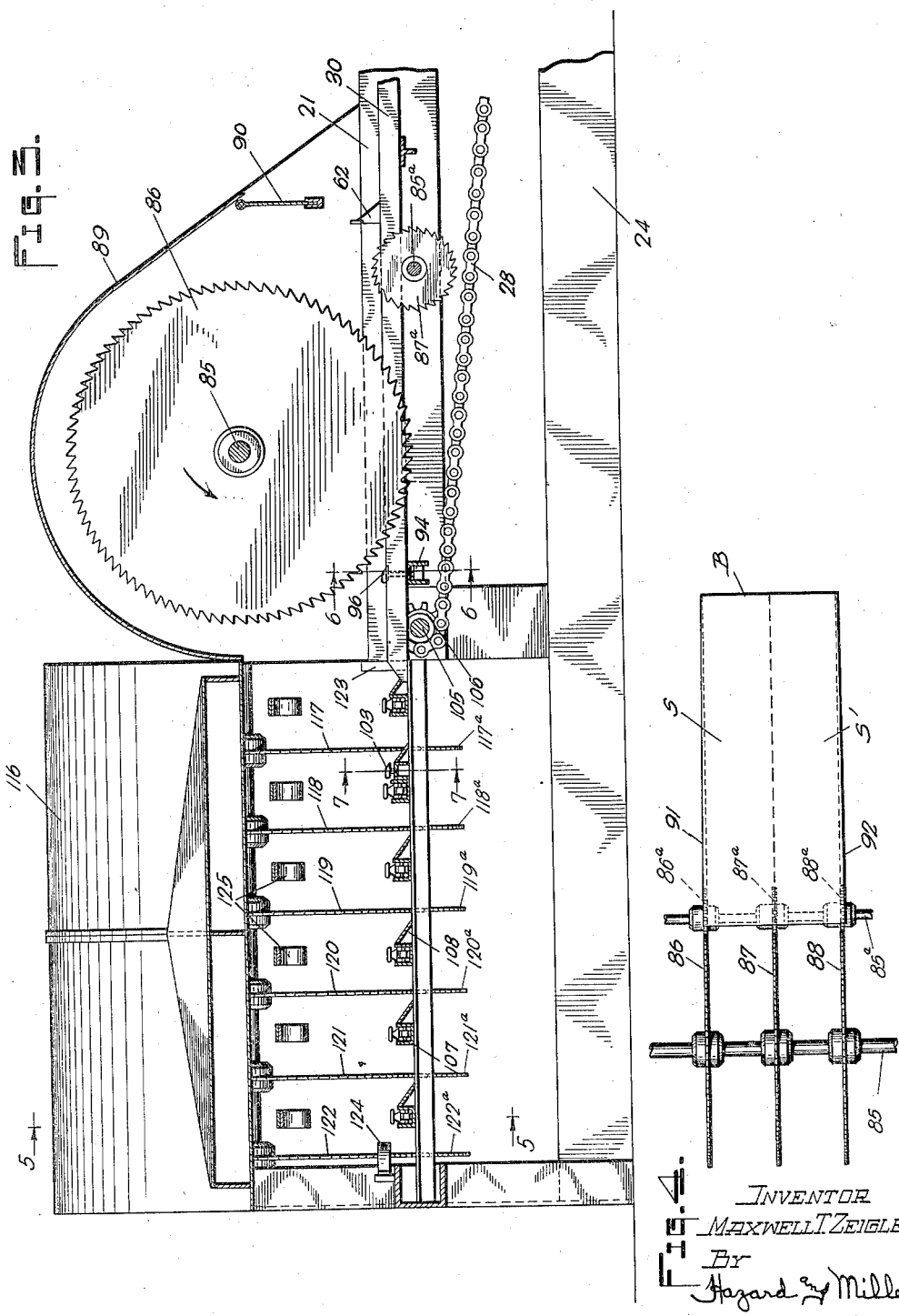
INVENTOR
MAXWELL T. ZEIGLER
By
Hazard & Miller
ATTORNEYS.

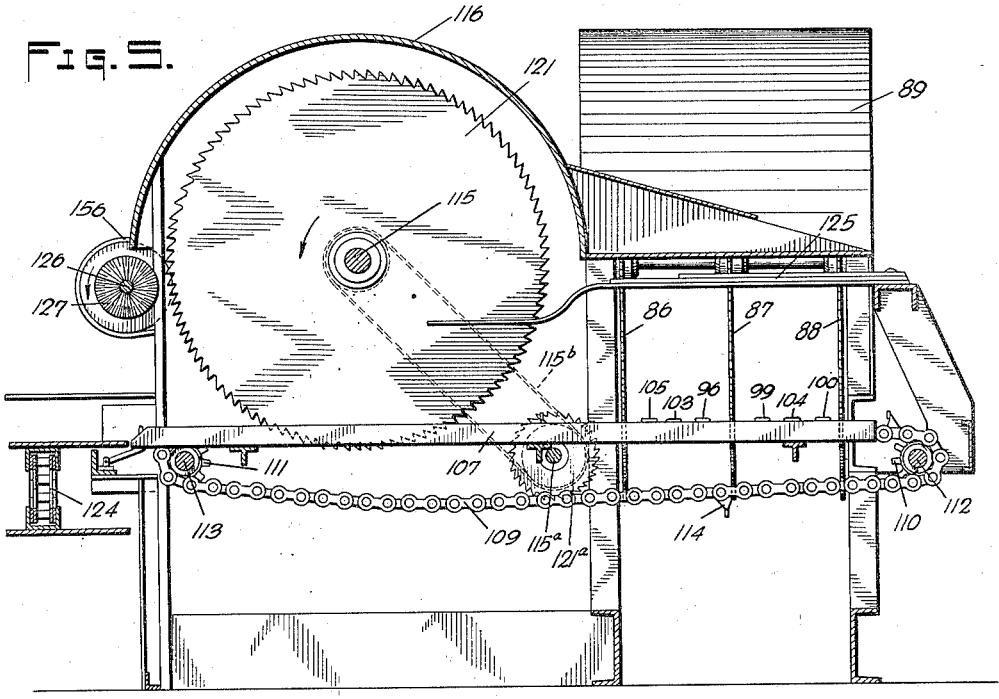

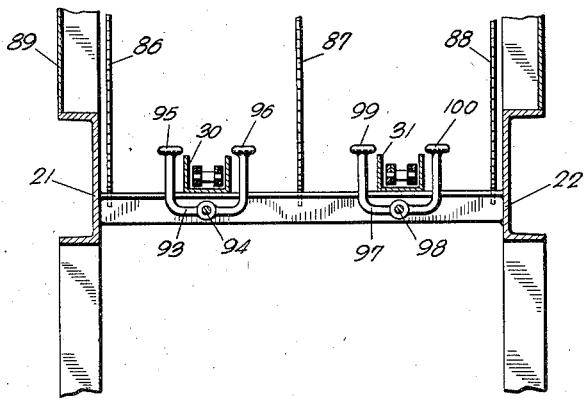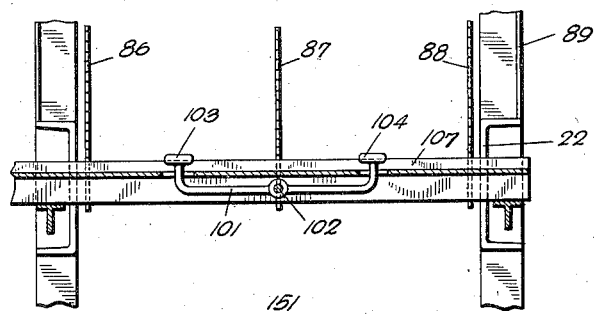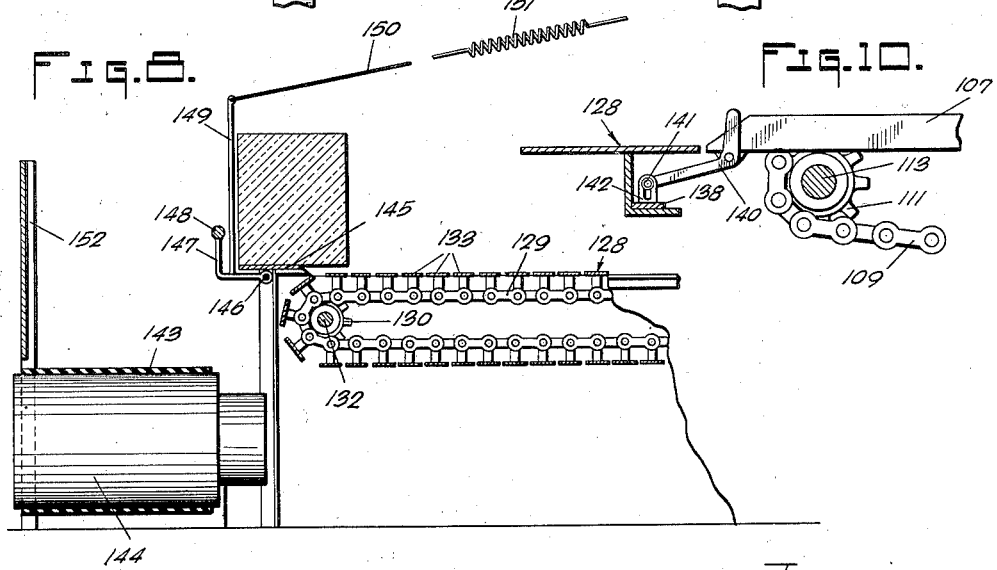

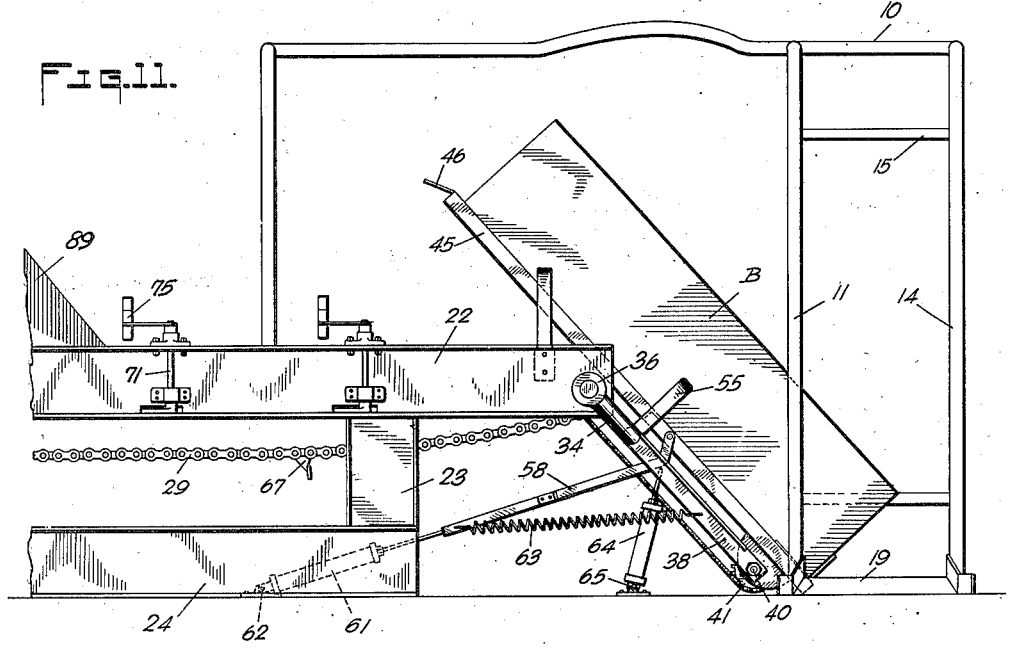
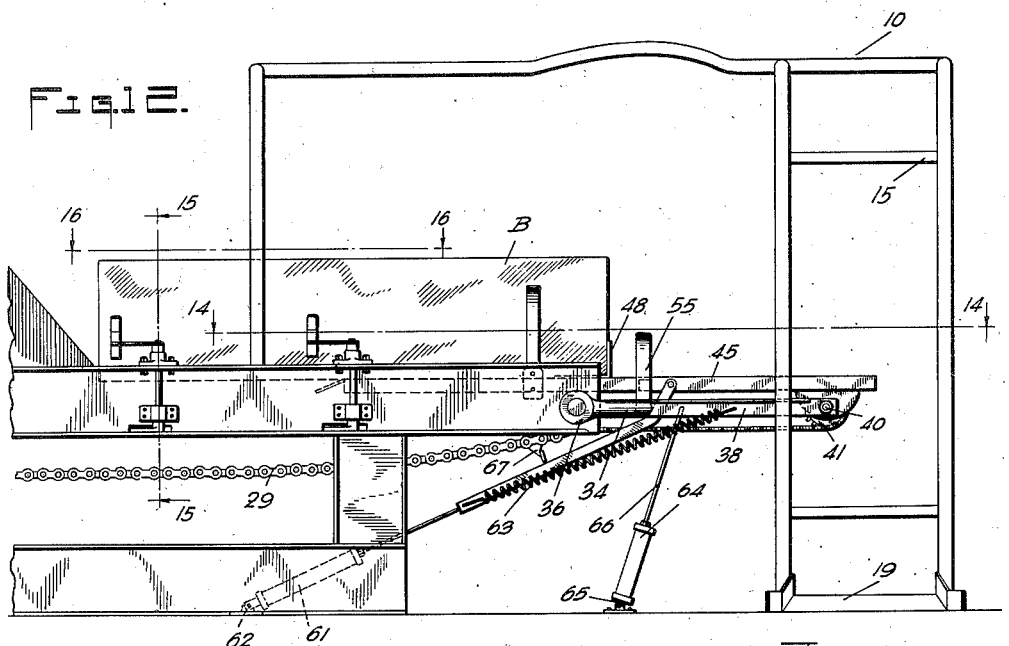

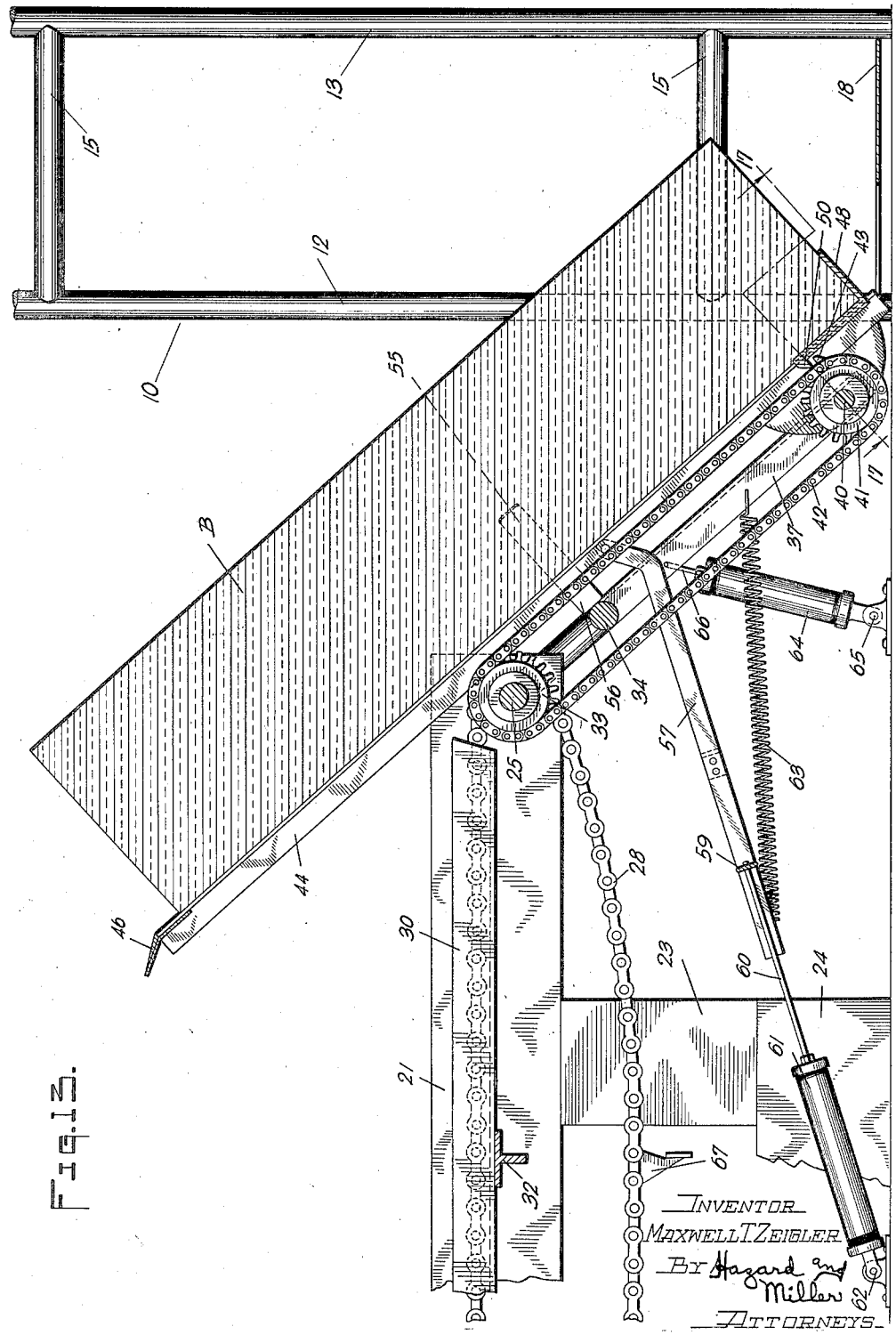

May 18, 1937.  M. T. ZEIGLER  2,080,452
ICE CUTTING MACHINE
Filed Nov. 10, 1933   9 Sheets-Sheet 8
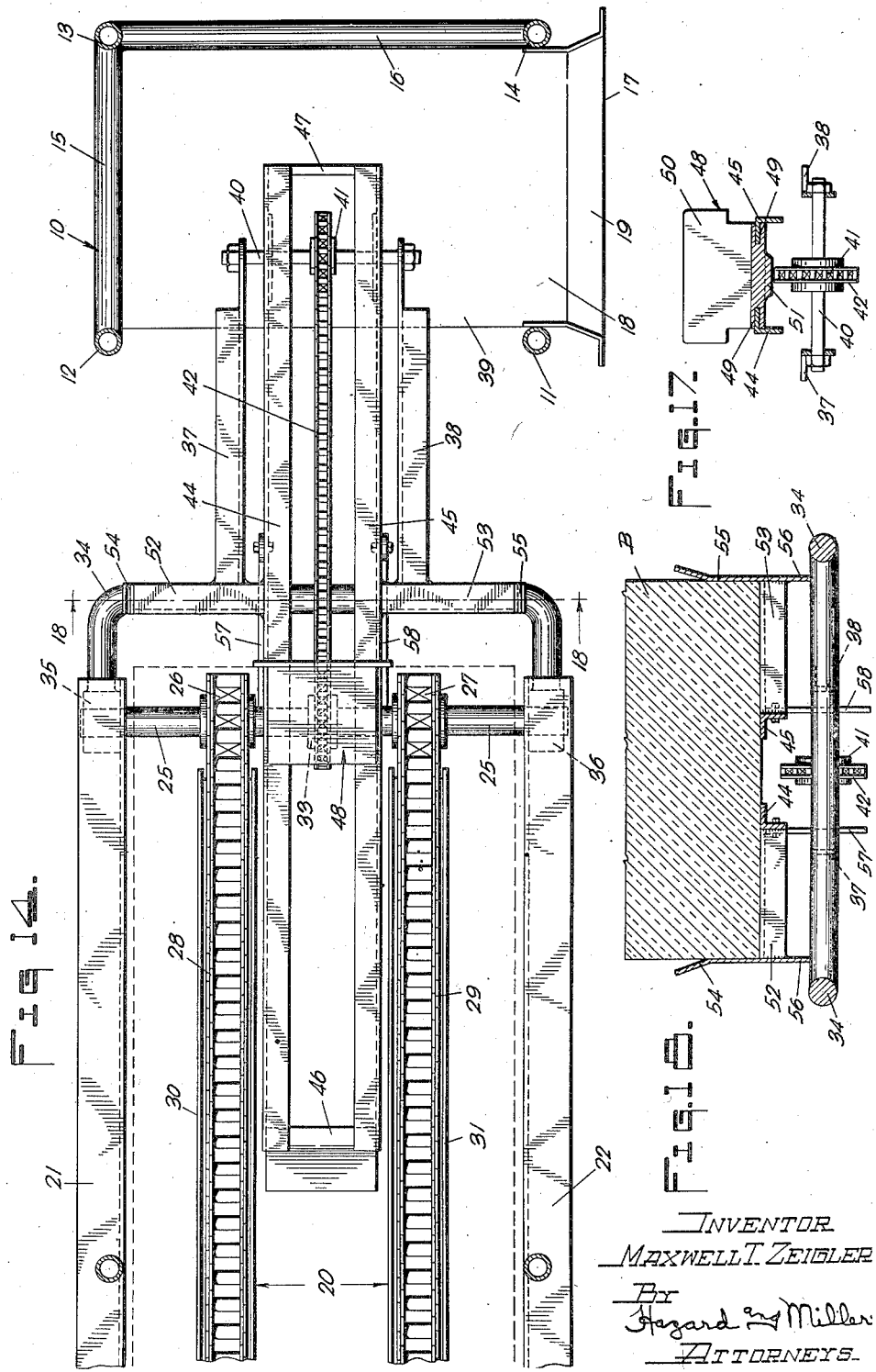
INVENTOR
MAXWELL T. ZEIGLER
By Hazard and Miller
ATTORNEYS

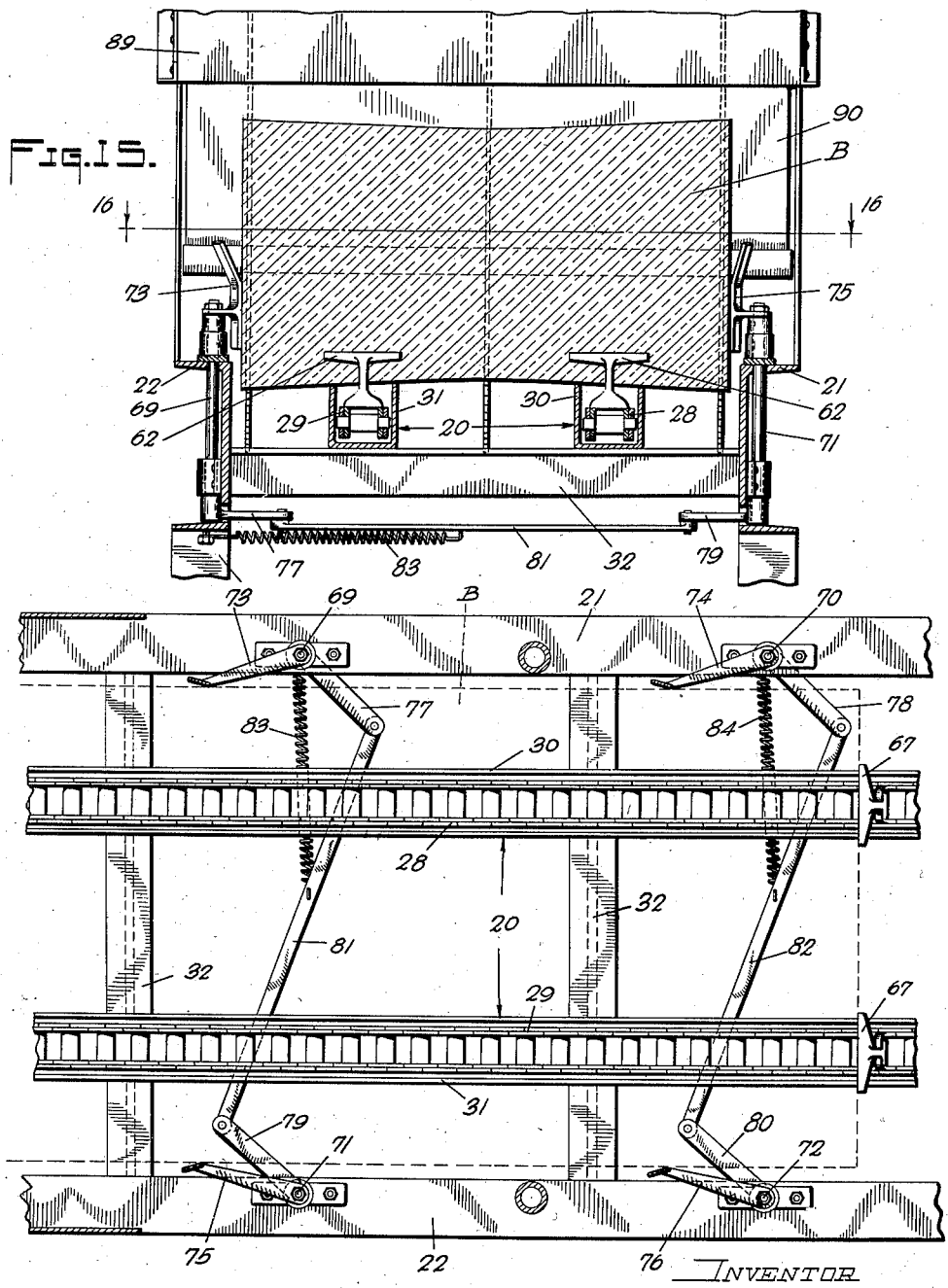

Patented May 18, 1937

2,080,452

UNITED STATES PATENT OFFICE 2,080,452

ICE CUTTING MACHINE

Maxwell T. Zeigler, Huntington Park, Calif., assignor, by mesne assignments, to Zeigler Packaged Ice Machinery Corporation, Huntington Park, Calif., a corporation of California Application November 10, 1933, Serial No. 697,375

16 Claims. (Cl. 143—49)

This invention relates to improvements in ice cutting machines. The application may be considered a continuation in part of the subject matter disclosed in my allowed application Serial No. 572,966, filed November 4, 1931, and allowed May 12, 1933.

In manufacturing ice for general distribution the conventional practice is to freeze water in tapered ice cans forming blocks of ice which have a taper from top to bottom in conformance with the shape of the ice can. These blocks, according to conventional practice, weigh approximately three hundred pounds. I have proposed distributing ice to consumers by means of ice vending machines wherein the ice is cut up into small blocks, each block weighing, for example, twenty five pounds, and the blocks vended being of approximately uniform size. I find it advantageous to vend such small blocks of ice in wrapped condition with each block individually wrapped and sealed within a paper wrapper. The ice vending machine is maintained at sub-freezing temperature to prevent the melting of the ice so that a cold, dry package of ice is dispensed.

A primary object of the invention disclosed in this application is to provide an ice cutting machine into which may be fed large blocks of ice which may conform in size and weight to the blocks obtained from the conventional ice manufacturing apparatus. The ice cutting machine is so designed as to cut the large blocks into the desired small blocks of equal weight and approximately equal size and shape and deliver these blocks on to an ultimate conveyor in such a position that the ultimate conveyor may deliver the blocks to one or more ice wrapping machines which wrap the individual blocks.

More specifically, an object of the invention is to provide a novel, simple, and advantageous mechanism for automatically loading large blocks of ice on to a conveyor which feeds the blocks into a first gang of saws serving to rip saw the block into strips. In ice storage plants in which the improved ice cutting machine may be installed, conventional practice is to store the large three hundred pound blocks on end, that is, with their smaller end resting on the floor and the large end uppermost. The improved loading mechanism enables these blocks to be slid consecutively on to the loading apparatus and thereafter the apparatus will automatically elevate the blocks and deposit them on a conveyor which feeds them to the first or rip saw gang.

Another object of the invention is to provide an improved centering mechanism which will center the blocks on the conveyor so that as they are fed into the rip saw gang they will be properly positioned so as to be divided into strips and have their side tapers removed, the object being to remove the side tapers without wastage and form the strips with parallel sides without cutting away any more ice than that required to true the block up with its bottom.

Another object of the invention is to provide an ice cutting machine having provision for ripping the block into strips and then automatically carrying the strips through a cross cut saw gang dividing the strips into the small blocks. In this connection a more specific object of the invention is to so cut the strips on carrying them through the cross cut saw gang that the trailing ends of the strips which were trailing on passing through the rip saw gang will be held against a suitable guide. It will be understood that the large blocks delivered from the freezing apparatus may not be of uniform height. On passing the blocks through the rip saw gang it is desirable to have the large end of each block positioned foremost so that the small end trails. On moving the strips through the cross cut saw gang it is desirable to have the smaller ends or trailing ends of the strips guided and what was originally the top end trimmed off.

Another object of the invention is to provide an ice cutting machine employing circular saws and to provide a rotary brush behind the saws arranged to rotate in a direction so as to sweep sawdust in the direction of the saws, thus delivering from the machine a clean, hard set of small blocks of ice.

Another object of the invention is to provide an ice cutting machine which is associated with an ultimate conveyor which conveys the blocks to the ice wrapping machines and to provide a mechanism for turning the blocks as they are positioned on the ultimate conveyor so that they rest on a cut side. This positioning of the blocks enables them to rest solidly on the ultimate conveyor and in such a position that although the blocks do vary slightly in exact shape they are so positioned as to be capable of being neatly wrapped by the automatic wrapping machines regardless of the lack of uniformity of shape.

Another object of the invention is to provide a mechanism for supporting strips of ice as they are delivered from the rip saw gang. Because of the taper of the cans in which the ice is frozen the faces of the blocks present somewhat dished or concave surfaces. On ripping the center of the block the concave surface would tend to allow the strips to fall together as soon as they are separated and to tend to pinch upon the circular saw. This would result in the saw knocking off rear corners of the strips unless some suitable provision is made for so supporting the strips that they will not tend to fall together and pinch on the circular saw. The improved machine provides such a mechanism which will properly support the strips so as to avoid this falling and pinching tendency.

With the foregoing and other objects in view, which will be made manifest in the following detailed description, and specifically pointed out in the appended claims, reference is had to the accompanying drawings for an illustrative embodiment of the invention, wherein:

Fig. 2 is a top plan view of the ice cutting machine.

Fig. 3 is a vertical section taken substantially upon the line 3—3 upon Fig. 2.

Fig. 4 is a diagrammatic view illustrating a large block of ice about to be fed into the rip saw gang and illustrating by dotted lines on the block of ice the manner in which the block is ripped into strips.

Fig. 5 is a vertical section taken substantially upon the line 5—5 upon Fig. 3.

Fig. 6 is a vertical section taken substantially upon the line 6—6 of Fig. 3 to illustrate a portion of the mechanism used for supporting the strips of ice produced by the rip saw gang so that the strips will not tend to fall together and pinch upon the center saw of the rip saw gang.

Fig. 7 is a vertical section taken substantially upon the line 7—7 upon Fig. 3, illustrating the remaining part of the mechanism used for supporting these strips.

Fig. 8 is a vertical section taken substantially upon the line 8—8 upon Fig. 2 illustrating the mechanism employed to turn the blocks delivered from the ice cutting machine so as to position them on the ultimate conveyor on a freshly cut side.

Fig. 9 is a partial view in plan illustrating the receiving conveyor and the mechanism which causes this receiving conveyor to intermittently stop to receive ice as it is delivered from the cross cut saw gang.

Fig. 10 is a vertical section taken substantially upon the line 10—10 upon Fig. 9.

Fig. 11 is a view in side elevation similar to the right hand end of Fig. 1 but illustrating the loading apparatus as having a large block of ice positioned thereon and about to lift this block and position it on to the conveyor which feeds it into the rip saw gang.

Fig. 12 is a view similar to Fig. 11 but illustrating the loading apparatus in the position it assumes when the large block has been lifted and positioned on the conveyor and as passing through the centering mechanism.

Fig. 13 is a vertical section through the loading apparatus when the apparatus is in the position as shown in Fig. 11.

Fig. 14 is a horizontal section taken substantially upon the line 14—14 upon Fig. 12, the block of ice, however, being illustrated as having been removed.

Fig. 15 is a vertical section taken upon the line 15—15 upon Fig. 1.

Fig. 16 is a partial view in plan illustrating the centering mechanism which centers the blocks of ice before feeding them into the rip saw gang; it may be considered as having been taken upon the line 16—16 upon Fig. 12, the block of ice, however, having been removed.

Fig. 17 is a sectional view taken upon the line 17—17 upon Fig. 13.

Fig. 18 is a sectional view taken upon the line 18—18 upon Fig. 14.

Figure 1:
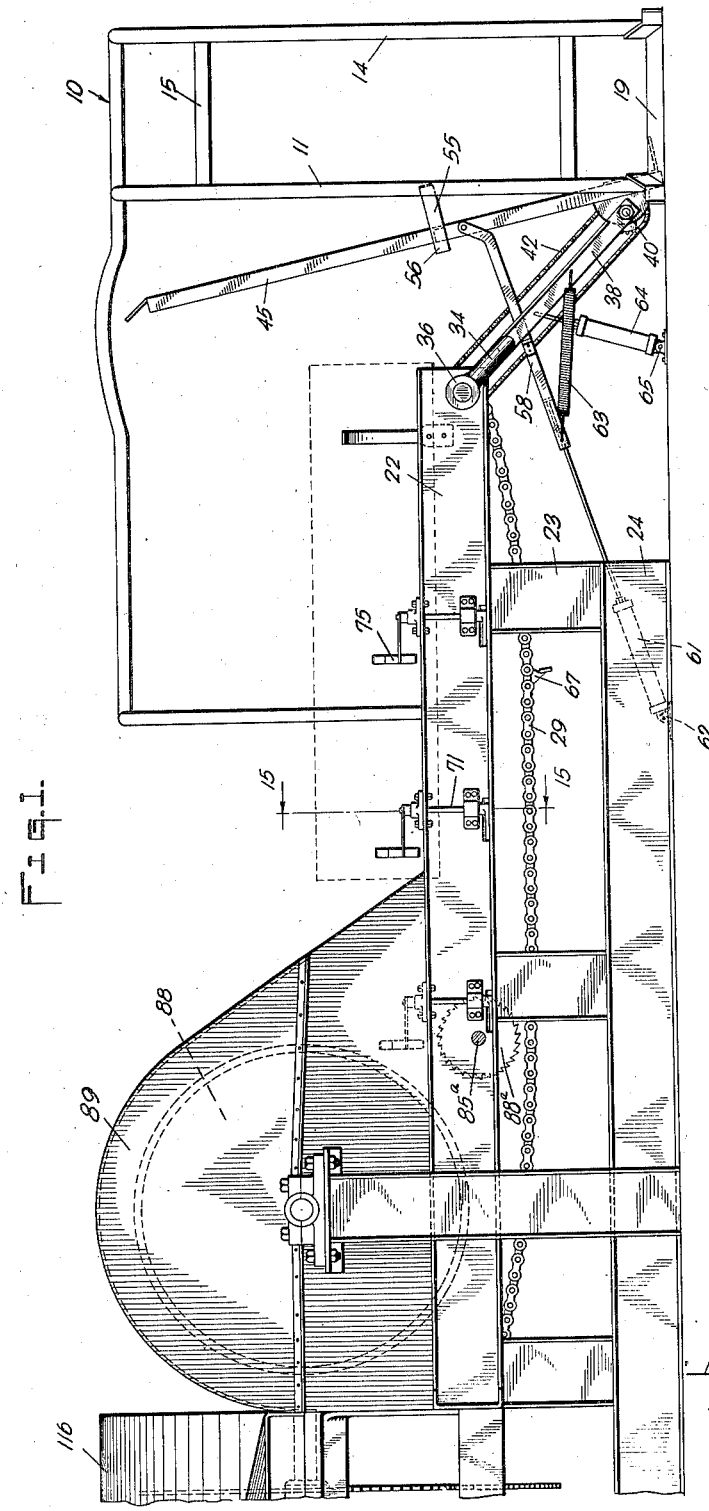
Fig. 1 is a partial view in side elevation illustrating a portion of the ice cutting machine and illustrating the loading and centering mechanism used for loading and centering the blocks as they are positioned on the conveyor which carries them through the rip saw gang.

Referring to the accompanying drawings, wherein similar reference characters designate similar parts throughout, it is proposed to describe the apparatus by describing first the loading apparatus which loads the large three hundred pound blocks on to the conveyor which conveys them to the rip saw gang, then the centering mechanism, the rip saw gang, the strip supporting the mechanism, the cross cut mechanism, the receiving conveyor, the block turning mechanism, and finally the ultimate conveyor on which the blocks are positioned to be conveyed to the ice wrapping machines.

Referring first to Figs. 1, 11, 12, 13, 14, 17, and 18, which figures illustrate the loading apparatus,—the loading apparatus consists of a suitable cage generally designated at 10. This cage is made of pipe or tubing providing four uprights 11, 12, 13, and 14 (see Fig. 14). Uprights 12 and 13 are connected by horizontal members 15 forming the back for the cage, and uprights 13 and 14 are connected by horizontal member 16 forming a side for the cage. The cage has an open forward side indicated at 17 and an elevated bottom 18, which is elevated a short distance above the floor and to which a very short inclined ramp 19 leads. This cage is in alignment with a power driven conveyor generally designated at 20. The conveyor is supported by means of longitudinally extending channels 21 and 22 which are supported on supporting posts 23 on a bed frame 24. At the ends of the channels there is a rotary shaft 25 which carries chain sprockets 26 and 27 over which endless chains 28 and 29 are trained. The upper reaches of these chains pass through guide channels 30 and 31, which are supported between the channel irons 21 and 22 by means of cross bars 32. Rotary shaft 25 has a third chain sprocket 33 fixed thereto at about its center. A yoke 34 has knuckles 35 and 36 connecting it to the ends of rotary shaft 25 so that although rotary shaft 25 turns, the yoke merely pivots on the ends of this rotary shaft. This yoke extends across the forward end of the conveyor 20, and parallel angle irons 37 and 38 are secured thereto and extend downwardly and forwardly therefrom into the open side 39 of cage 10. The ends of these angle irons are connected by a spindle or shaft 40 on which a chain sprocket 41 is mounted for rotation. An endless chain 42 is trained over chain sprockets 33 and 41. This endless chain carries a single projecting lug 43 (see Fig. 13).

An ice lowering frame is provided consisting of two angle irons 44 and 45 connected at opposite ends by connecting plates 46 and 47. These angle irons are pivotally mounted or pivotally connected to shaft 40. They form a track for an angular plate 48 (see Figs. 13 and 17). This angular plate has a body portion which has its sides grooved as at 49 (see Fig. 17) so as to be slidable between the opposed flanges on the angle irons. It has an upstanding portion 50 on which the bottom of the block of ice is to be positioned. On the underside of the body portion and arranged at about its center there is a downwardly extending lip 51 so positioned as to be arranged in the path of the dog 43 on endless chain 42. At approximately midway along the lengths of angle irons 44 and 45 there are welded outwardly extending arms 52 and 53. These arms may, likewise, be formed of angle iron and at their ends they are provided with upwardly extending brackets 54 and 55, the upper ends of which may diverge outwardly to a slight extent. These brackets are designed to receive and embrace the sides of the block of ice and to maintain the block on the lower frame and to guide its movement when it is shifted from the lower frame on to conveyor 20. The lower ends of the arms are extended downwardly beneath the ends of arms 52 and 53, as indicated at 56 (see Figs. 13 and 18), forming extensions in which engage the crossbar of yoke 34 limiting downward pivotal movement of the lowering frame about shaft 40 as a center toward yoke 34 and its angle iron arms 37 and 38. A pair of links 57 and 58 are pivotally connected to angle irons 44 and 45 a short distance below arms 52 and 53. These links are connected to each other by a crossbar 59 which, in turn, is centrally connected to the piston rod 60 of a dash pot 61 which may be pivotally mounted as indicated at 62 to the floor or to the bed frame 24 of the machine. The function of this dash pot is to retard movement of the ice lowering machine provided by angle irons 44 and 45 as it moves from a vertical position into an inclined position as shown on Fig. 13. The ends of links 57 and 58 are connected to the angle iron arms 37 and 38, respectively, by coiled springs 63 which serve to urge the links 57 and 58, piston rod 60, and the ice lowering frame provided by angle irons 44 and 45 into an upright position.

A second dash pot 64 is pivotally mounted as indicated at 65 to the floor or to the bed frame and the piston rod of this dash pot, indicated at 66, is pivotally connected directly to angle iron arm 37 which is rigid with yoke 34. The function of this dash pot is to retard movement of yoke 34 and its arms 37 and 38 in a counterclockwise direction about shaft 25 as a center.

The operation of the loading apparatus as above described is as follows:

When it is desired to feed a block of ice B to the machine these blocks, which are kept stored in the storage room resting on their small ends, are caused to slide on at a time on to bottom 18 of cage 10. When the lowering frame is unloaded the springs 63 return the lowering frame into an upright or nearly vertical position as shown in Fig. 1, in which position portion 50 of the slide 48 is either flush with or disposed below the top surface of platform 18. Thus the block of ice B can be pushed into the cage over portion 50 of the slide. It is then given a forward push in the direction of the lowering frame. This causes the block of ice B to fall or tip against the lowering frame and cause the lowering frame to swing about shaft 40 in a counterclockwise direction. The movement of the lowering frame is retarded by dash pot 61 until the extensions 56 on brackets 54 and 55 engage the cross arm of the yoke 34. The endless chains 28 and 29 are being continuously driven by a source of power hereinafter to be described and this results in rotation of shaft 25. Chain 42 is thus continuously driven and shortly dog 43 engages lip 51. This causes the slide 48 to slide the block B upwardly on the lowering frame which is in the inclined position shown in Fig. 13. This movement continues until the center of block B passes above the center of shaft 25. With the center of gravity of block B thus shifted above shaft 25 the block by its own weight will cause yoke 34, the lowering frame, and all associated structure to rotate in a counterclockwise direction about shaft 35 as a center. This rotational movement is retarded by dash pot 64. It is limited by the bottom of block B engaging the top edges of channel irons 30 and 31 of conveyor 20. Sliding movement of block B relatively to the lowering frame formed by angle irons 44 and 45 continues until lip 51 is disengaged by dog 43 passing around chain sprocket 33 on shaft 25.

It will be noted from an inspection of Fig. 14 that the lowering frame fits within or between channel irons 30 and 31. The half of block B which remains on the lowering frame also rests on channel irons but maintains the lowering frame in the horizontal position shown on Figs. 12 and 14 until the block is completely removed by means of conventional chains 28 and 29. When the block has been completely removed from the lowering frame springs 63 are operable to swing yoke 34 about shaft 25 in a clockwise direction and to return links 57 and 58 and the lowering frame into such a position that the lowering frame is upright, ready to receive the next adjacent block. It will thus be noted that in loading the machine it is merely necessary to push a block B into the cage and then give it a tilting push toward the lowering frame. From then on the apparatus is entirely automatic in sliding block B upwardly on the lowering frame until by means of its own weight it tips itself up shaft 25 as a center on to conveyor 20. When the block of ice is removed and the lowering frame is returned by means of springs 63 slide 48 merely slides downwardly on angle irons 44 and 45 until it reaches its lowermost position wherein it engages connecting member 47.

During any period of time that the machine is in operation without involving the loading of a block B it will be noted that chain 42 continues to operate. However, due to the load receiving position of the lowering frame as shown in Fig. 1 wherein it is not parallel to the upper reach of chain 42, dog 43 on engaging lip 51 merely lifts the slide a few inches until the divergence between the length of the lowering frame and the upper reach of chain 42 is such as to cause dog 43 to disengage lip 51 and allow the slide to fall back into its initial position.

Each of chains 28 and 29 carries dogs 67 which are arranged on passing around chain sprockets 26 and 27 to swing upwardly behind the trailing end of block B and to move the block off of the upper half of the lowering frame and to slide it forwardly on channel irons 30 and 31, thus starting the block in the direction of the first gang of saws constituting the rip saw gang. The position of dog 67 on chains 28 and 29 is such as to be timed with respect to dog 43, the intention being to have dog 67 swing up against the trailing end of block B just after dog 43 disengages lip 51 by passing around chain sprocket 33. In the event that a block B is pushed into cage 10 and tipped against the lowering frame at such a time just prior to the passing of dogs 67 around chain sprockets 26 and 27, dogs 67 merely pass beneath the face of the block, lifting the block and the lowering frame up shaft 40 as a center sufficiently to permit dogs 67 to pass beneath the block. After the dogs pass beneath it the block and lowering frame fall back into the position shown on Fig. 13 to be picked up by dog 43 on its next cycle of movement.

As the block moves forwardly on channel irons 40 and 41, being impelled by dogs 67, it encounters a centering mechanism. From the foregoing description it will be appreciated that the large end of the block is the leading end and the small end of the block is the trailing end. In centering the block with respect to the conveyor it is desired to have both ends which are of unequal size perfectly centered with respect to the rip saw gang. This centering mechanism is clearly disclosed on Figs. 15 and 16. On each of channel irons 21 and 22 at suitable intervals there are mounted vertical rock shafts, four of which are shown on Fig. 16 indicated by reference characters 69, 70, 71, and 72. Above the tops of the channel irons these rock shafts carry presser members 73, 74, 75, and 76. They are arranged to engage the sides of block B as it passes between them. Those presser members which are diposed most adjacent shaft 25 have their upper ends outwardly flared so as to facilitate entry of block B between them as it swings downwardly about shaft 25 as a center. The rock shafts 69, 70, 71, and 72 also carry crank arms 77, 78, 79, and 80 which are disposed adjacent the bottoms of the channel members 21 and 22. As is apparent from an inspection of Fig. 16, crank arms 77 and 78 form obtuse angles with presser members 73 and 74 while crank arms 79 and 80 form acute angles with presser members 75 and 76. Crosslinks 81 and 82 connect crank arms 77 and 79 and 78 and 80, respectively, so that these cross links are operatively connected to their respective presser members on opposite sides of the pivots provided by the rock shafts for these presser members. These connecting links are such that link 81 will cause presser members 73 and 75 to move in unison either inwardly or outwardly. Likewise, link 82 causes presser members 74 and 76 to move inwardly and outwardly in unison. All of the presser members are urged into innermost positions by means of springs 83 and 84 which connect the links to channel iron 21.

As block B passes between the presser members in the event that the large end is too far toward presser member 73 this presser member will be swung outwardly by the block. It remains in engagement with the side of the block and continuously presses the block in an opposite direction. The outward movement of presser member 73 produces a simultaneous outward movement of presser member 75, moving it out of engagement with the opposite side of the block. Presser member 73 continuously presses the block toward presser member 75 and this presser continues and serves to center the forward end of the block until the inward movement of presser member 73 permits inward movement of presser member 75 until it engages the opposite side of the block. When both presser members are pressing on the side of the block in equal force the forward end of the block is perfectly centered with respect to the conveyor. Presser members 74 and 76 are operable upon the block independently of presser members 73 and 75. While presser members 73 and 75 are serving to true the position of the forward end of the block on the conveyor presser members 74 and 76 are simultaneously operating on the rear trailing or smaller end of the block and are serving to true it also with respect to the conveyor. In this way the block is automatically positioned on the conveyor and as it moves along the conveyor it is perfectly centered with respect thereto.

At the rear end of the conveyor 20, which is shown on Fig. 3, there is disposed a first gang of saws. This gang constitutes a rip saw gang, the purpose of which is to rip the block into strips. A rotary shaft 85 is disposed above the conveyor, rotating in the direction of the arrow on Fig. 3. This shaft carries three circular saws 86, 87, and 88, which are equally spaced. The distance between saws 86 and 88 is preferably exactly equal to the width of block B at its small or trailing end. These saws are enclosed within a suitable housing indicated at 89, the front and back of which are open. The front of the housing preferably carries a pivoted flap or a stiff canvas flap indicated at 90 which hangs downwardly from the housing and while it will swing upwardly to permit the block B to pass into the housing it will subsequently swing down into the position shown to prevent sawdust from the saws being thrown out of the open forward end. This rip saw gang cuts the block into strips indicated at S and S' on Fig. 4. These strips are of equal width but are not of uniform height or thickness from end to end because of the fact that the top and bottom faces of the block are tapered as well as the side edges. Saws 86 and 88 remove the side tapers from the block, which tapers are indicated at 91 and 92 so that the strips have truly parallel sides. It will be understood that the entire machine is preferably constructed over a pit so that these removed tapers 91 and 92 which are cut from the sides of the block, the sawdust and water produced by melting sawdust, may drop into this pit and be piped off.

As is readily apparent from an inspection of Fig. 15, the top and bottom faces of the block as delivered by the conveyor ice cans are somewhat dished or slightly concave. Because of this uneven surface on which the block is supported the two strips S and S' into which the block is ripped will tend to ride on their outer bottom edges and to fold or rock in together toward each other with a tendency to pinch on the center circular saw 87. If these strips were permitted to pinch on this saw the trailing inner corners of the strips would be apt to be knocked off by the teeth of the saw. As a provision for preventing the strips from so rocking or riding on their outer lower edges pivot brackets are arranged behind the gang of rip saws 86, 87, and 88. The first of these brackets that the strips encounter are illustrated in Fig. 6. One bracket 93 is pivoted as at 94 beneath conveyor channel 30. This bracket has equal arms carrying heads 95 and 96 which are disposed slightly above the tops of the sides of channel 30. They are equidistant from pivot 94. The other bracket is indicated at 97 pivoted as at 98 directly beneath conveyor channel 31. This bracket, likewise, has equal arms carrying heads 99 and 100 which are slightly disposed above the top of channel 31. Behind this pair of brackets there is a third bracket, as shown on Fig. 7, indicated at 101, which is pivoted at 102 and carries equal arms provided with heads 103 and 104. Pivot 102 is arranged in alignment with center saw 87. As the strips S and S' pass from between the saws of the rip saw gang they engage and ride upon these brackets. Strip S slides upon heads 95 and 96 on bracket 93 so that this strip is supported by this bracket on a pivot which is disposed vertically beneath its center line. Likewise, strip S' is supported by bracket 97 on pivot 98, which is vertically beneath its center line. The forward ends of the strips encounter heads 103 and 104, respectively, thus providing a three point support for each strip. The brackets 93 and 97 accommodate themselves to the dished or uneven surface on the bottoms of the strips so that there is no tendency of the strips to fall toward each other due to their uneven bottom surfaces and pinch on center saw 87. As will be noted in Fig. 3, a transverse shaft 105 carrying chain sprockets 106, is disposed rearwardly of the rip saw gang adjacent the rear ends of channels 30 and 31. The endless chains 28 and 29 are trained over these chain sprockets on this shaft.

As an additional precautionary means for preventing the corners at the rear ends or trailing ends S and S' from being broken off an additional transverse shaft 85a may be mounted on the frame for conveyor 20 so as to be disposed below channels 30 and 31. This shaft carries one or more saws indicated at 86a, 87a, and 88a on Fig. 4. These circular saws are somewhat smaller in size than saws 86, 87, and 88. Where three of such saws are used, as shown on Fig. 4, they are arranged directly in alignment with saws 86, 87, and 88. Shaft 85a is arranged downwardly and in advance of shaft 85. The saws 86a, 87a, and 88a project slightly above the top edges of channels 30 and 31. As the block B is carried along the conveyor 20 these saws serve to cut grooves on the bottom surface of each block in alignment with the cuts that will be made by saws 86, 87, and 88. The block is thus weakened on its bottom surface by saws 86a, 87a, and 88a so that if there is any tendency for the strips S and S' to break apart before being completely cut by the large saws the tendency will be to break on these weakened lines formed by saws 86a, 87a, and 88a. In this way these saws provide an additional precautionary means for preventing the trailing corners of strips S and S' from being broken off. In actual practice only a center saw 87a is usually required on shaft 85a although additional saws 86a and 88a may be used if desired. Shaft 85a is driven off of shaft 85 by a belt drive 85b (see Fig. 2).

Beyond the rear ends of channels 30 and 31 there is arranged a cross cut saw mechanism. A transverse conveyor is provided consisting of a series of transversely arranged channels 107. The forward sides of these channels are provided with inclined guide plates 108 so that when the strips slide off of conveyor 20 and over the various heads on the pivot brackets if their forward edges should tend to fall they will encounter these inclined guides and slide up and over the tops of these channels. Within channels 107 there are disposed the upper reaches of endless chains 109 (see Fig. 4). These chains are trained over chain sprockets 110 and 111 on longitudinally extending shafts 112 and 113, respectively, which are arranged adjacent the ends of channels 107. These chains carry dogs 114. The shafts 112 and 113 are so timed and dogs 114 are so positioned on the chain that they will encounter the outer side of strip S' after the strips have been completely delivered from conveyor 20. The dogs will force these strips S and S' in a transverse direction or in a direction at right angles to the length of conveyor 20. This transverse conveyor serves to force the strips into a cross cut saw gang, the strips moving in a transverse direction to their previous movement through the rip saw gang. The saws of the cross cut gang are mounted on a longitudinally extending shaft 115 arranged above the transverse conveyor and within a housing 116. These saws are indicated at 117, 118, 119, 120, 121, and 122. On that side of the housing 116 which is nearest the rip saw gang there is positioned a stationary guide 123 which is designed to be engaged by the trailing ends of the strips which trailed on passing through the rip saw gang. In other words, those surfaces of the strips S and S' which originally formed the bottom surface of the block B are designed to engage guide 123. On the opposite side of the housing one or more leaf springs 124 are provided. These springs serve to engage the forward ends of the strips or those ends of strips S and S' which led on passing through the rip saw gang and which originally formed the top of the block. During the transverse movement on the conveyor spring 124 is encountered, forcing the strips back into engagement with the stationary guide 123. The saws 117 to 122 in the preferred form of construction are not equally spaced. The distance between guide 123 and saw 117 is the longest and is slightly longer than the distance between saw 117 and saw 118. The distances between saws 118 and 119 and between 119 and 120 and between 120 and 121 and between 121 and 122 gradually decrease. This variation in the distances between the saws is for the purpose of dividing the strips into smaller blocks which are of exactly equal weight. It will be recalled that the original block which is fed to the machine is tapered. This taper is apparent on all four sides. Although tapers 91 and 92 are removed the top and bottom surfaces of the strips still have their tapers present. Consequently, the portions of the strips which pass between guide 123 and saw 117 will be somewhat thinner than portions of the strips passing between saws 121 and 122. The greater distance between guide 123 and saw 117 will be somewhat thinner than portions of the strips passing between saws 121 and 122. The greater distance between guide 123 and saw 117 compensates for the thinness of the strip portions which pass between the guide and this saw. Likewise, the shorter distance between saws 121 and 122 compensates for the thicker ends of the strips which pass between these two saws. The intermediate saws are so positioned as to properly compensate for the thicknesses of the strip portions which pass between them so that small blocks are cut which are of exactly equal weight or very nearly so.

As a means for preventing the small blocks cut from strips S and S' from breaking apart during the cross cutting operation a shaft 115a is arranged below channels 107 and extends in a longitudinal direction (see Figs. 2 and 5). This shaft carries a series of small saws indicated at 117a, 118a, 119a, 120a, 121a, and 122a. These saws are arranged in alignment with their respective saws 117, 118, 119, 120, 121, and 122. They project slightly above the tops of channels 107 so as to groove the bottom surfaces of strips S and S' in advance of these strips encountering the large saws. These grooves form transverse weakened lines on the bottoms of the strips so that if during the cross cutting there is any tendency of the small blocks to break apart the strips will break on these weakened lines, thus forming truly rectangular blocks which will not have broken off corners. Shaft 115a is driven off of shaft 115 by a belt 115b.

As the strips pass between the saws of the cross cut gang they are held downwardly on the cross cut conveyor by means of leaf springs 125. The saws of the cross cut gang are rotated in the direction of the arrow upon Fig. 4 so that the teeth on the saws move through the blocks in opposition to the direction of movement of the strips on the transverse conveyor. A rotary shaft 126 is mounted behind the saws of the cross cut gang. It rotates in the same direction as the saws of the cross cut gang, as indicated by the arrow on Fig. 4. This shaft carries a rotary brush 127 which is so positioned as to brush the top surfaces of the small blocks delivered from the cross cut gang and to throw the sawdust and ice particles toward the cross cut gang. In this way the brush not only sweeps the top surfaces of the blocks clean but it prevents the escape of sawdust through the housing 116 and returns all sawdust to the housing, from which it may fall through the conveyor into the pit.

Behind housing 116 there is disposed a receiving conveyor 128. This is formed by a plurality of endless chains 129 (see Fig. 8) which are trained over chain sprockets 130 on shafts 131 and 132. Each link of each of the chains carries an upstanding arm and the arms are connected by transversely extending slats 133. These slats are arranged parallel to channels 107 and cooperate to form the receiving conveyor onto which the small blocks are delivered from the cross cut gang. The receiving conveyor is driven by shaft 113 on which a miter gear 134 is mounted. This miter gear meshes with a miter gear 135 on shaft 132. Shaft 132 is divided as shown on Fig. 9 and in its construction it has a clutch 136. The clutch elements are urged into engaging position by means of a compressed coiled spring 137. One of the clutch engaging elements can be shifted out of engagement with the other, this being accomplished by means of a pivot lever 138 which is pivotally mounted as at 139 on the frame of the machine. Adjacent the rear end of one of the channels 107 there is pivotally mounted a bell crank 140 having a pin and slot connection 141 with an ear 142 on this lever. As the small blocks are delivered from the cross cut saw gang one of the blocks will encounter the upstanding portion of bell crank 140 which projects slightly above the channel. This causes the bell crank to rotate in a counterclockwise direction as viewed in Fig. 10, shifting lever 138 from left to right as viewed in this figure. This disengages the clutch elements of clutch 136, permitting the receiving conveyor formed by slats 113 to stop while the blocks are being delivered from channels 107 on to slats 133. As soon as the blocks have been positioned entirely on the receiving conveyor so that bell crank 140 is disengaged, spring 137 re-engages the clutch elements and returns lever 138 and bell crank 140 to normal position. When the clutch elements are re-engaged the receiving conveyor is operable to move the blocks positioned thereon from left to right as viewed in Fig. 9 and from right to left as viewed in Fig. 8.

At the end of the receiving conveyor there is disposed an ultimate conveyor in the form of an endless belt 143 which is trained over rollers 144. Between the receiving conveyor and this ultimate conveyor there is a pivoted platform indicated at 145. This platform is of a length so as to simultaneously receive two blocks. Its width, however, is only sufficient to partially extend under these two blocks positioned side by side. The platform is pivoted as indicated at 146 and carries an upstanding pair of arms 147 connected by a crossbar 148. It also carries an upstanding arm 149 to which a cable or rod 150, which is connected to a spring 151, is connected. The spring, as clearly shown on Fig. 2, is in turn connected to the top of housing 116. As the receiving conveyor moves it forces the leading two blocks on to the platform 145 and continued movement of the receiving conveyor is such as to crowd these leading blocks against crossbar 148. This tilts the platform on pivot 146, thus depositing the leading two blocks on the ultimate conveyor 143 and at the same time rotating these blocks through 90 degrees. The blocks slide off of the crossbar 148 but are confined on the ultimate conveyor by a stationary guide 152. The purpose of this construction is to deposit the blocks on the ultimate conveyor on a freshly cut side. In other words, the leading two blocks will have their sides which were cut by saw 122 positioned against the ultimate conveyor 143. In this way the blocks will rest on flat sides as distinguished from dished sides. They will rest solidly on the ultimate conveyor and will be transmitted by it to the automatic wrapping machines. After the first two blocks have been moved from the receiving conveyor to the ultimate conveyor by platform 145 the succeeding pair of blocks on the receiving conveyor are forced on to the platform which has been returned to its position shown on Fig. 8 by spring 151 and these, likewise, will be turned through 90 degrees and deposited on freshly cut sides on the ultimate conveyor.

It will be noted that in this arrangement that inasmuch as strips S and S' are of uniform width and equal width that all of the small blocks will have one uniform dimension which is equal to the width of one of the strips. This uniform dimension will be running lengthwise of conveyor 143 so that if a battery of wrapping machines is arranged adjacent this conveyor and a stop is arranged adjacent the end of the conveyor each of the blocks will occupy a uniform length on the conveyor. This is of particular importance when a battery of wrapping machines receive blocks from the conveyor 143 in that the blocks are all crowded against the stop and because of their uniform lengths a block will be properly centered with respect to each of the battery of wrapping machines. The uniform length of the blocks is also important in wrapping the blocks by means of the automatic wrapping machines in that it enables a known length of paper to be used which will have the proper lap in the folding operations and wrapping around the block.

Shafts 85 and 115 are driven at relatively high speeds from a gear box indicated at 153 (see Fig. 2). This gear box, the details of which so closely approach conventional practice as not to require detailed explanation, is driven by electric motor 154. Shaft 105 for the ripping conveyor 20 is driven from a reduction gear box 155; likewise, shaft 113 is driven from this reduction gear box. Shaft 132 is driven off of shaft 113. The reduction gear box 155 is driven by a belt drive, the belt of which is indicated at 156 off of shaft 115. In this way the entire machine is driven from a single source of power, to wit: motor 154.

From the above described construction it will be appreciated that an improved ice cutting machine is provided designed to handle large blocks of ice as they are produced by conventional ice manufacturing apparatus. Workmen in the storage room are merely required to slide individual blocks of ice to cage 10. After sliding them into the cage they are merely given a tilting push in the direction of the lowering frame. From there on the construction is automatic. The block is caused to slide up on the lowering frame until it is overbalanced and swings itself on to conveyor 20. It then is carried through the rip saw gang removing tapers 91 and 92 and dividing the block into strips S and S'. These strips are so supported on brackets 93, 97, and 101 that they will not tend to pinch center saw 87 and have their trailing corners knocked off by the saw. The strips are then picked up by the transverse conveyor, shifted into engagement at their trailing ends with stationary guide 23 and are carried through cross cut saw gang. Saw 122 trims off the top or leading ends of the strips. The blocks are delivered on to the receiving conveyor of substantially uniform weight, having one uniform dimension. The other dimensions may vary slightly. The blocks are transported from the receiving conveyor on to the ultimate conveyor in such a manner as to be positioned on freshly cut sides with their uniform dimensions running lengthwise of the ultimate conveyor. The ultimate conveyor may then transport them to their respective wrapping machines.

The entire machine is so timed that when the blocks are positioned on the receiving conveyor they will all be removed therefrom on to the ultimate conveyor before a new group of blocks is delivered from the cross cut gang. Also, the conveyor 20 is so timed that it will not force the strips through the rip saw gang until previous strips have been started through the cross cut gang. Likewise, the loading apparatus will not deposit a large block on conveyor 20 until a previously deposited block has been carried through the rip saw gang. In this way there is never any danger or occasion for ice going through the machine to interfere.

While the machine has been designed for cutting ice, it will be appreciated that various features of the construction are not necessarily restricted to ice cutting but may be employed elsewhere in machines designed to cut other materials.

Various changes may be made by those skilled in the art in the details of construction without departing from the spirit or scope of the invention as defined by the appended claims.

I claim:

1. An ice cutting machine comprising, in combination, rip saw means for ripping a block into strips, a power conveyor for moving the block through the saw means, and brackets pivotally mounted behind the saw means for movement about axes extending longitudinally of the power conveyor adapted to receive and support the strips upon passing through the saw means.

2. An ice cutting machine comprising, in combination, rip saw means for ripping a block into strips, a power conveyor for moving the block through the saw means, and brackets pivotally mounted behind the saw means for movement about axes extending longitudinally of the power conveyor adapted to receive and support the strips upon passing through the saw means, one of the brackets being arranged to engage and assist in the support of two strips.

3. An ice cutting machine comprising, in combination, rip saw means for ripping a block into strips, a power conveyor for moving the block through the saw means, cross cut saw means arranged at right angles to the rip saw means for cross cutting the strips into small blocks, a second power conveyor for picking up the strips from the rip saw means and forcing them through the cross cut saw means, and brackets pivotally mounted at the adjacent ends of the two power conveyors for supporting the strips received from the rip saw means.

4. An ice cutting machine comprising, in combination, rip saw means for ripping a block into strips, a power conveyor for moving the block through the saw means, cross cut saw means arranged at right angles to the rip saw means for cross cutting the strips into small blocks, a second power conveyor for picking up the strips from the rip saw means and forcing them through the cross cut saw means, and brackets pivotally mounted at the adjacent ends of the two power conveyors for supporting the strips received from the rip saw means, said brackets being pivotally mounted for movements about axes extending longitudinally of the rip saw means conveyor.

5. An ice cutting machine comprising, in combination, rip saw means for ripping a block of ice into strips, a power conveyor therefor, cross cut saw means for cross cutting the strips into small blocks, a power conveyor for the cross cut saw means, said rip saw means and cross cut saw means being arranged at right angles to each other, a receiving conveyor behind the cross cut saw means, the direction of travel of which is parallel to the rip saw means and at right angles to the cross cut saw means, means for driving the power conveyors and receiving conveyor in such a manner as to move strips out of the path of a block being ripped before being encountered by the block and so as to move a group of small blocks on the receiving conveyor out of the path of the strips being cross cut before being encountered by the strips.

6. An ice cutting machine comprising, in combination, rip saw means for ripping a block of ice into strips, a power conveyor therefor, cross cut saw means for cross cutting the strips into small blocks, a power conveyor for the cross cut saw means, said rip saw means and cross cut saw means being arranged at right angles to each other, a guide adjacent the cross cut saw means arranged to be engaged by the trailing ends of the strips received from the rip saw means, and means for pressing the strips against said guide as they are passed through the cross cut saw means.

7. In an ice cutting machine, a gang of saws and actuating means therefor, a conveyor adapted to carry blocks of ice against and past said saws, and means tiltable transversely with respect to the conveyor adapted to engage the bottom of said block and lift it from said conveyor as the block passes said saws to compensate for deviation of said bottom from a flat surface.

8. In an ice cutting machine, a conveyor adapted to transport blocks of ice, a saw adapted to split a block of ice on said conveyor into strips, and means tiltable transversely with respect to the conveyor for engaging said strips as they pass said saw and supporting them independently of said conveyor to compensate for deviation of the bottom of said block from a flat surface.

9. In an ice cutting machine, a conveyor adapted to transport blocks of ice, a saw adapted to split said blocks into two strips, and pivotally mounted U-shaped brackets each having two legs spaced equally on opposite sides of its pivotal support and extending upwards through said conveyor to support said strips independently of said conveyor as the strips pass said saw, each of said strips being supported adjacent one end by both legs of one of said brackets and each strip being supported adjacent its other end by one of the legs of another bracket.

10. In an ice cutting machine, a conveyor adapted to transport blocks of ice, a saw adapted to split said blocks into two strips, and pivotally mounted U-shaped brackets each having two legs spaced equally on opposite sides of its pivotal support and extending upwards through said conveyor to support said strips independently of said conveyor as the strips pass said saw, each of said strips being supported adjacent one end by both legs of one of said brackets, and means for supporting each of said strips adjacent its other end and below the center line thereof.

11. In an ice cutting machine, a conveyor, a gang of saws for the conveyor, and self-accommodating means behind the saws serving to support the strips of ice as they leave the saws and accommodate itself to the bottoms of the ice strips, said self-accommodating means including a pivoted member pivoted for movement about an axis longitudinally of the conveyor and straddling the saw line.

12. In an ice cutting machine, a conveyor, a gang of saws for the conveyor, and self-accommodating means behind the saws serving to support the strips of ice as they leave the saws and accommodate itself to the bottoms of the ice strips, said self-accommodating means including a pivoted member pivoted for movement about an axis longitudinally of the conveyor and having portions engageable upon the bottom surfaces disposed equidistance from the axis on opposite sides thereof.

13. An ice cutting machine comprising, in combination, saw means for ripping a block of ice into strips, means for cross cutting the strips into small blocks, an ultimate conveyor, and means for depositing the small blocks on the ultimate conveyor in such a manner that they rest upon a freshly cut side and the dimensions of the blocks defined by the rip saw means extend lengthwise of the ultimate conveyor.

14. An ice cutting machine comprising, in combination, rip saw means for ripping a block of ice into strips, cross cut saw means for cross cutting the strips into small blocks, a receiving conveyor onto which the small blocks are delivered from the cross cut saw means, an ultimate conveyor onto which the receiving conveyor discharges, and means for turning the small blocks onto a freshly cut side upon passing from the receiving conveyor to the ultimate conveyor, said saw means and conveyors being so arranged that when the blocks are deposited on the ultimate conveyor dimensions of the blocks defined by the rip saw means extend lengthwise of the ultimate conveyor.

15. An ice cutting machine comprising, in combination, rip saw means for ripping a block of ice into strips, cross cut saw means for cross cutting the strips into small blocks, a receiving conveyor onto which the small blocks are delivered from the cross cut saw means, an ultimate conveyor onto which the receiving conveyor discharges, said rip saw means, cross cut saw means, receiving conveyor, and ultimate conveyor being arranged at right angles to each other, and means for turning the small blocks on passing from the receiving conveyor to the ultimate conveyor so that when the blocks are deposited on the ultimate conveyor they will be resting upon a side cut by the cross cut saw means with the dimensions of the blocks defined by the rip saw means extending lengthwise of the ultimate conveyor.

16. An ice cutting machine comprising, in combination, rip saw means for ripping a block of ice into strips, cross cut saw means arranged at right angles to the rip saw means for cross cutting the strips into small blocks, a receiving conveyor arranged at right angles to the cross cut saw means, an ultimate conveyor arranged at right angles to the receiving conveyor, and onto which the receiving conveyor discharges, whereby when the blocks are delivered onto the ultimate conveyor the dimensions of the blocks defined by the rip saw means will be arranged to extend lengthwise of the ultimate conveyor.

MAXWELL T. ZEIGLER.